United States Patent [19]

Saladin

[11] Patent Number: 4,784,338
[45] Date of Patent: Nov. 15, 1988

[54] DEVICE TO DRIVE A BODY THAT CARRIES OUT A TUMBLING AND ROTATING MOTION

[75] Inventor: Joseph Saladin, Wil, Switzerland

[73] Assignee: Oloid AG, Basel, Switzerland

[21] Appl. No.: 96,019

[22] PCT Filed: Nov. 25, 1986

[86] PCT No.: PCT/CH86/00162
§ 371 Date: Jul. 27, 1987
§ 102(e) Date: Jul. 27, 1987

[87] PCT Pub. No.: WO87/03351
PCT Pub. Date: Jun. 4, 1987

[30] Foreign Application Priority Data

Nov. 29, 1985 [DE] Fed. Rep. of Germany ....... 3542285

[51] Int. Cl.⁴ ............................................. B02C 19/00
[52] U.S. Cl. .................... 241/101.2; 74/660;
241/199.7; 241/205; 366/287
[58] Field of Search .................. 74/660; 366/282, 283, 366/287, 288; 241/101.2, 118, 120, 125, 199.4, 199.7, 205, 206, 199.1

[56] References Cited

U.S. PATENT DOCUMENTS

| 11,109 | 6/1854 | Ambler ........................ 241/206 X |
| 2,302,804 | 11/1942 | Schatz . |
| 4,669,225 | 6/1987 | Kuster . |

FOREIGN PATENT DOCUMENTS

| 1145455 | 3/1963 | Fed. Rep. of Germany . |
| 1207750 | 12/1965 | Fed. Rep. of Germany . |
| 3034331 | 8/1984 | Fed. Rep. of Germany . |
| 3542285 | 8/1986 | Fed. Rep. of Germany . |
| 496912 | 11/1970 | Switzerland . |

*Primary Examiner*—Mark Rosenbaum
*Attorney, Agent, or Firm*—Watson, Cole, Grindle & Watson

[57] ABSTRACT

An apparatus for mixing or stirring materials comprises an oloid-shaped body element which is connected by forked control gimbals to pivot bearings at the ends of two respective parallel shafts, the first shaft being attached to a support member to be fixed in position and the second shaft being rotatably mounted relative to the support member so as to be rotatable about its longitudinal axis and also around the first shaft at a fixed distance. Simultaneous rotation of the second shaft about the first shaft and about its longitudinal axis will cause the oloid-shaped body element to move in a tumbling and rotating fashion.

7 Claims, 3 Drawing Sheets

DEVICE TO DRIVE A BODY THAT CARRIES OUT A TUMBLING AND ROTATING MOTION

BACKGROUND OF THE INVENTION

The invention relates to a device for driving a body which is suspended from two forked control gimbals by means of pivots for motion around two axes that are skewed with respect to one another, the body carrying out a tumbling and rotating motion based on the principle of the invertable link chain. Each control rod is connected to a shaft by means of the respective swivel bearing.

To assure that the body carries out the tumbling and rotating motion, at least one of the two parallel shafts is driven in a manner that the second shaft rotates due to the connection of the two shafts by means of the members of the link chain, comprising the control gimbals and the body.

However, the kinematics of the invertable link chain requires that the two shafts must rotate opposite to another and alternately with periodically alternating increasing and decreasing angular frequency if the object is to attain a regular motion of the simultaneously rotating and tumbling body hung on the control rods.

The body itself can serve as a container to accommodate the materials treated, which are subject to physical or chemical processes, achieving especially good effects with respect to the course of such processes due to the simultaneous tumbling and rotational motion. In particular, it can be used in the preparaton of mixtures whose components to be mixed are finely distributed, e.g., the mixing of very sensitive fine powders with lubricants for the extrusion of a paste or with color pigments, the powders being used in the production of plastic. Furthermore, the purpose of the body can be to homogenize, emulsify, or prepare powder mixtures such as for example a dry powdered metal.

Especially good effects are achieved with an oloidal body, which is a control body with two convex corners, that have the same constant curvatures and are in two orthogonal planes, whereby a casing surface has overall straight surface lines between these corners. In known oloidal bodies the motion is such that there is no change point with respect to the path already taken along the path of trajectory of the point of the oloid. The three dimensional path of trajectory of all points of the moved body is the explanation for the good mixing results when using such a body.

The same body, however, can also achieve the same good effects in processed materials, which surround the body, i.e., when used as a stirring member. Due to the special nature of its motion, as described above, the body is superior to any other merely rotating stirring member in which one must accept a separation due to centrifugal action and a shearing stress on the substance to be stirred due to the vortex formation and due to the high energy consumption corresponding to the generation of turbulent currents.

No shearing action occurs with the tumbling and rotating body described above when used as a stirring member in a liquid; the motion occurs without any break in the flow at the ends of the body and without the turbulence associated therewith. In the resulting motion of the liquid, air or oxygen that has been introduced is immediately dispersed and distributed homogeneously. Therefore, the device in a preferred embodiment is suitable for sanitizing water through the introduction of oxygen. This is only one of the numerous possibilities for its application.

The drive of the body via at least one shaft, or for a larger body and corresponding performance preferrably both parallel shafts, presents a number of technical problems due to the acceleration or delays required alternately at both shafts.

For the drive of just one shaft in a so-called pendulum drive, known from Ch-PS No. 496 912, a pivotable pendulum that is connected to the drive shaft is arranged to pivot on the same drive shaft. A control body which is automatically coupled with the shaft and is preferably shaped like a crank which is pivoted at the pendulum, is on the pendulum. In operative connection with at least one reference point of the device, the crank causes a periodic, swiveling motion of the pendulum occurring as a function of the speed of rotation of the shaft. The crank is driven by means of a belt with half the speed of rotation of the same. The reference point of the device which is operationally connected to the crank is a guide slot in which the crankpin slides back and forth so that at every revolution of the drive shaft the pendulum makes two complete swings back and forth, whereby as the pendulum moves in the direction of rotation of the drive shaft by overlapping the two motions, the result is acceleration and as the pendulum moves in the opposite direction the result is delay. With this drive, which is rather expensive in its mechanical construction, only one of the two shafts can be driven so that for the size of the vessel to be displaced into tumbling and rotating motion, the limit is approximately a 500 liter content.

In order to drive both shafts having non-uniform angular speeds, various solutions have been proposed. However, they have been demonstrated to be unusable for industrial use. Thus, for example, the application of Cardan joints between the drive shafts and a motor-driven shaft, which forms a 45° angle with the extended axis of the shaft, driven by it, because as is well-known with a Cardan joint, the angular speeds will change periodically, is known from DE-PS No. 1 145 455. However, this drive needs a lot of space; and due to the sharp 45° distortion there is too much wear in the Cardan joints and shaft bearings. Thus the solution is not suitable for commercial usage.

A device, known from DE-PS No. 1 207 750, to solve this drive problem has a friction ball drive as a differential gear at one end of the shafts, whereas the second shaft is driven by way of a chain from a ring of this friction ball drive. However, due to the non-uniform angular speed of both shafts, there is so much friction in the differential gear that this solution is not suitable for continuous use in industry.

Furthermore, a drive having an elastic shaft couplings at the drive shafts, is known from DE-PS No. 3 034 331. Between the coupling disks on a circle, balls that are are arranged alternately in sequence, and pressure springs permit in this non-automatic drive a periodically repeating relative distortion of the coupling pieces to one another. Here the disadvantage is that the elastic yield in the drive system, which is effected by the forces due to inertia, do not conform with the required rhythm of motion. The cost of producing that which is accomplished by this solution is also relatively high.

It has also been mentioned that the body is used not only as a mixing container but also as a stirring member in a medium surrounding the body. The medium here can be, for example, water into which oxygen is to be introduced by means of the tumbling and rotating body, and in this case one needs only a body which is small in proportion to the volume of water contained in a container, as a stirring member.

As stated above, it is sufficient to drive only one of the two parallel shafts, whereby due to its connection via the links of the link chain to the driven shaft, the second shaft is rotated clockwise by the shaft. Friction, which the drive of the driven shaft must overcome, occurs in all links of the link chain and in the positioning of the non-driven shaft. When the shaft makes one revolution, the body, hung via the control rods on both shafts, also carries out the tumbling, rotating motion once until it reaches the same starting point. With respect to the tumbling and rotating motion it is now immatterial whether the one shaft is rotated in the machine frame, accommodating the two shaft positions, or whether the machine frame is rotated around the shaft as the central axis, whereby due to the connection between the two shafts, the shaft, which rotates and is arranged only to pivot at a distance from the center shaft in the machine frame, is rotated by means of the links of the link chain so that the hung body carries out the tumbling and rotating motion.

SUMMARY OF THE INVENTION

The problem on which the present invention is based is to develop a simple drive for a tumbling and rotating body, which, in particular, is meant to be used as a stirring member in a medium surrounding it. With the drive additional steps to be taken in its construction in order to compensate for the non-uniform angular speeds of the shaft bearing the body can be dispensed with. This goal is achieved by the invention in that the one shaft rotates at a constant distance from the second shaft around the shaft. Preferably the rotating shaft is rotated in a ring, driven rotating and concentric to the second shaft. Expediently this ring can be driven by a gear rim, connected to the ring, and by a gear wheel, mating with the gear rim, whereby this gear wheel is mounted on the shaft of a drive motor. Expediently, the ring is pivoted on the second fixed shaft, extending through the center of the ring. Expediently, the fixed shaft can be held in a machine housing, formed by a round disk. The drive motor is flanged to the housing and the ring, which is pivoted with a gear rim and with which one of the two shafts, bearing the body rotates rotates below the housing.

The advantage of the device of the invention is not only that one achieves the desired effect with a simple device that is inexpensive to produce when using the tumbling and rotating body as a means of obtaining an external effect in a medium, surrounding said body, as for example when introducing oxygen into a water but also that in the application, named in the example, better results are obtained than with a known device of equal size in which the body is driven by parallel shafts in a machine frame in order to carry out the tumbling and rotating motion. The quantity of oxygen introduced thus is larger and the time required for this is less. Consequently this beneficial effect also results from the fact that in addition to the tumbling and rotating motion of the body, the body also moves on a circular path around the one shaft as the center. Thus the effect spreads out on all sides.

Of course, the tumbling and rotating motion of the body itself is not identical to the motion of a body, driven by one or more stationary shafts, which, however, in light of the advantages, described above, can be expected, first of all since one can manage with less drive performance with the body rotating in the manner as stipulated in the invention, because the introduced starting torque at a longer lever arm is effective and the ring, bearing the rotating shaft, including the weight load hanging from the ring, acts as a centrifugal mass.

A better understanding of the invention will be had by reference to the attached drawings and the following discussion.

DETAILED DESCRIPTION OF THE PREFERRED EMBODIMENT

Figure 1:
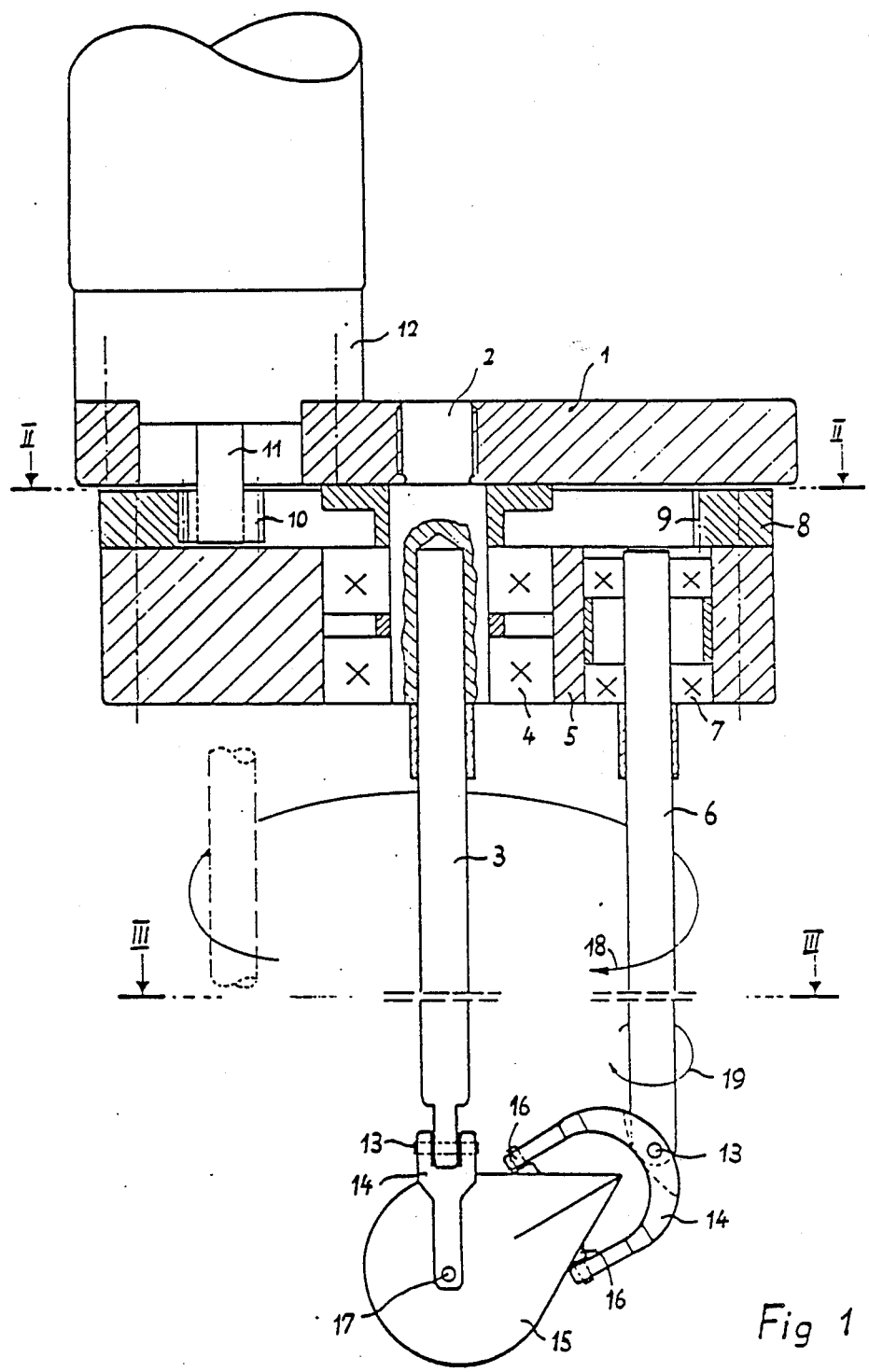
FIG. 1 is an elevational side view, partially sectioned, through an apparatus according to a preferred embodiment of the present invention.
Figure 2:
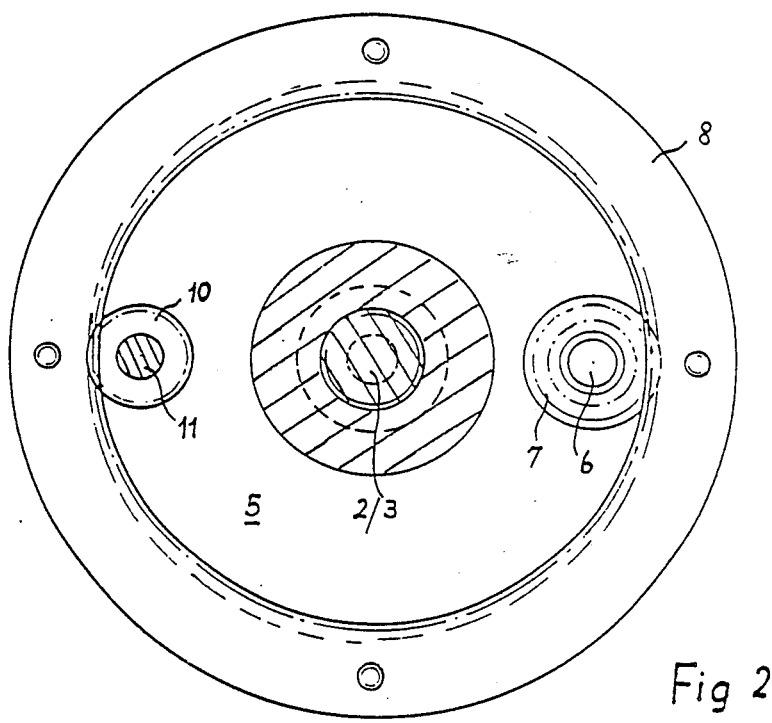
FIG. 2 is view of the apparatus as seen along the line II—II in FIG. 1.
Figure 3:
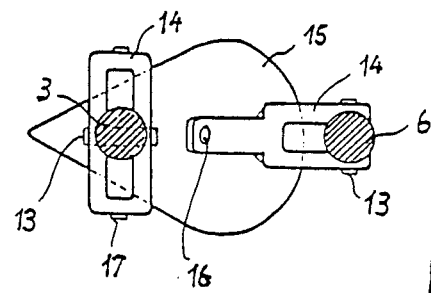
FIG. 3 is a view of the apparatus as seen along the line III—III in FIG. 1.

As seen in FIG. 1, the apparatus includes a bearing disk 1, in whose center a body of the axle 2 is mounted. In the body of the axle 2 the fixed shaft 3 is mounted. The body of the axle 2 and the shaft 3 can also be made as a one piece unit. A ring 5 is rotated by means of roller bearings 4 on the body of the axle 2. In the ring 5, the rotating shaft 6 is rotated by means of the roller bearings 7 at a distance from the fixed shaft 3. On the ring 5 at the top, a gear rim 8 is fastened to an internal gearing 9. A gear wheel 10, which is mounted on the shaft 11 of a drive motor 12, which is flanged to the bearing disk 1, mates with this internal gearing 9. The gear wheel 10, driven by the motor 12, rotates with the gear rim 8 and the ring 5, connected to the gear rim, around the body of the axle 2, fixedly mounted in the bearing disk 1.

At the bottom ends of each of the two shafts 3 and 6, a forked control rod 14 is pivoted by means of a swivel bearing 13. The tumbling and rotating motion to be carried out at the body 15, hung on the control rods 14, has the shape of an oloid and has two central pivots 16 for the connection to the right control rod 14 in FIG. 1 and the two central pivots 17 for the connection to the left control rod 14. The connecting line of both central pivots 17, shown sequentially in the drawing plane in FIG. 1, forms the one axis; and the connection line, skewed to axis, of the two central pivots 16 forms the second axis around which the two skewed axes of the body 15 are movable. And thus the tumbling and rotating motion is carried out when the shaft 6 rotates around the fixed shaft 3, as indicated by the arrow 18, whereby the shaft 6 rotates around its axis, as indicated by arrow 19. While the shaft 6 makes one rotation, the body 16 makes a complete rotation and at the same time tumbles as it rotates. The forked control rod 14 pivots only back and forth on the end of the fixed shaft 3. Pre-requisite for the motion, described above, is equal distances between the swivel bearing 13 and the axis extending through the two central pivots 16 at the right control rod in FIG. 1 and between the swivel bearing 13 and the axis extending through the two central pivots 17 at the left control rod 14. And the distance between the two skewed axes must also be the same size. This fixed distance times the root 3 yields the required distance between the two shafts 3 and 6.

Figure 4:
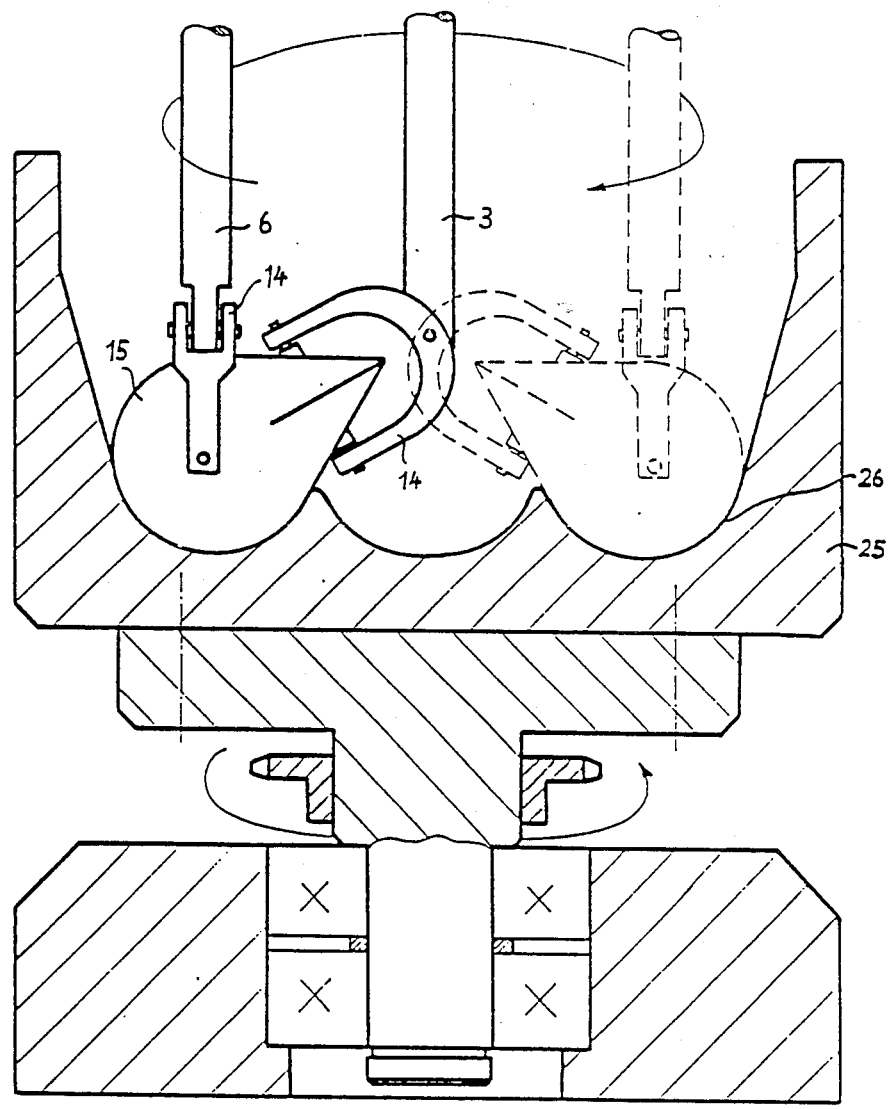
FIG. 4 is a side view of a bottom portion of the apparatus in FIG. 1 together with a mixing container.

Another application of the tumbling and rotating body, which makes a rotational motion, is shown in FIG. 4. A container 25, driven to rotate opposite to the rotational motion of the body 15, has a circular depression 26. The arched floor of the depression has a radius of curvature, which agrees with that of the circular corner of the body 15 in its rotating position, as shown in FIG. 4. The body 15 assumes this position twice during one revolution. By arbitrarily choosing the rotational speed of the container 25, various kinds of powders or bulk material that are in the depression 26 can be mixed or treated in another manner, for example by adding an aqueous component.

I claim:

1. A material treatment apparatus which comprises
   a stationarily positioned support member,
   a first shaft which is fixedly connected to said support member and extends away from said support member, said first shaft including a first pivot bearing at an end thereof remote from said support member,
   a body element which has first and second pairs of aligned pivot pins extending away from opposite sides thereof, said first and second pairs of pivot pins defining respective first and second rotation axes which are askew to one another,
   a first forked control gimbal connected between said first pivot bearing and said first pair of aligned pivot pins,
   a rotation member rotatably mounted on said support member, said rotation member having a center of rotation which is coaxial with said first shaft,
   a second shaft which has a longitudinal axis and which extends away from said support member in parallel with said first shaft, said second shaft being mounted so as to be rotated by said rotation member around said first shaft and also so as to be rotatable around said longitudinal axis thereof, said second shaft having a second pivot bearing at an end thereof remote from said support member,
   a second forked control gimbal connected between said second pivot bearing and said second pair of aligned pivot pins, and
   drive means for rotating said rotation member, thereby causing said second shaft to rotate about said first shaft, which in turn simultaneously causes said body element to move in a tumbling and rotating movement and said second shaft to rotate about its said longitudinal axis.

2. A material treatment apparatus according to claim 1, wherein said rotation member is in the form of a ring.

3. A material treatment apparatus according to claim 2, including a gear rim rotatably mounted on said support member, said ring being rotated with said gear rim, and wherein said drive means includes a gear wheel which is connected to said gear rim to rotate said gear rim.

4. A material treatment apparatus according to claim 2, wherein said ring is rotatably journalled around said first shaft.

5. A material treatment apparatus according to claim 1, wherein said body member is shaped as an oloid.

6. A material treatment apparatus according to claim 1, including a container which includes a circular depression in which said body element is movably positionable, said container being rotatable in an opposite direction to the rotation of said second shaft around said first shaft.

7. A material treatment apparatus according to claim 1, wherein said first and second forked control gimbals are sized such that the distance between said first pivot bearing and said first rotation axis is equal to the distance between said second pivot bearing and said second rotation axis.

* * * * *